United States Patent
Sando et al.

[11] Patent Number: 5,110,481
[45] Date of Patent: May 5, 1992

[54] METHOD FOR SEPARATION OF POLYVINYL ALCOHOL FROM AQUEOUS SOLUTIONS THEREOF USING PEROXODISULFATES

[75] Inventors: Yoshiteru Sando; Eiichi Nakano; Hiroshi Ishidoshiro, all of Wakayama, Japan

[73] Assignee: Sando Iron Works Co., Ltd., Wakayama, Japan

[21] Appl. No.: 698,670

[22] Filed: May 10, 1991

[30] Foreign Application Priority Data

May 17, 1990 [JP] Japan ................................. 2-127720
Jul. 5, 1990 [JP] Japan ................................. 2-177874

[51] Int. Cl.$^5$ .............................................. C02F 1/72
[52] U.S. Cl. ................................... 210/721; 210/759; 210/908; 210/724; 210/774; 525/61; 28/166; 28/168
[58] Field of Search ............... 210/721, 759, 908, 774, 210/724; 28/166, 168; 525/61, 387; 423/513

[56] References Cited

U.S. PATENT DOCUMENTS

| | | | |
|---|---|---|---|
| 3,232,869 | 2/1966 | Gard | 210/759 |
| 3,318,856 | 5/1967 | Deyrup | 525/61 |
| 3,518,242 | 6/1970 | Chrisp | 525/61 |
| 4,078,129 | 3/1978 | Yamagata et al. | 210/705 |
| 4,202,745 | 5/1980 | Exner et al. | 210/702 |
| 4,331,539 | 5/1982 | Schenk et al. | 210/620 |
| 4,416,786 | 11/1983 | Knorre et al. | 210/759 |
| 5,026,485 | 6/1991 | Anderson | 210/723 |

Primary Examiner—Stanley S. Silverman
Assistant Examiner—Neil M. McCarthy
Attorney, Agent, or Firm—McAulay Fisher Nissen Goldberg & Kiel

[57] ABSTRACT

A method for separation of PVA from an aqueous solution thereof such as the waste water containing PVA from the pretreatment of a textile product, in which a peroxosulfate such as ammonium peroxosulfate is added to an aqueous PVA solution, particularly in an acidic condition with addition of sulfuric acid, at a temperature above 70° C. for the separation of PVA, and as a result the thus separated PVA contains only a small amount of water in the range of about 60–70% and can easily be treated.

3 Claims, 3 Drawing Sheets

METHOD FOR SEPARATION OF POLYVINYL ALCOHOL FROM AQUEOUS SOLUTIONS THEREOF USING PEROXODISULFATES

BACKGROUND OF THE INVENTION

1. Field of the Invention

The present invention relates to a method for separation of polyvinyl alcohol contained, for instance, in the waste water of the treatment of textile products.

2. Description of the Related Art

In the textile industry, polyvinyl alcohol (hereinafter will be described in short as PVA) is used widely, for instance, as a sizing agent for preventing the thread breakage in weaving. The PVA for this purpose is dissolved in the washing bath in the course of desizing and scouring, and accordingly the COD load in the drainage is unavoidably increased. Further, since PVA can hardly be decomposed due to the action of bacteria, when it is discharged into the river or the sea as it stands without being decomposed, the amount of oxygen dissolved in water becomes unavoidably decreased, and the death of the organisms in water is caused to occur due to the break of the balance in the ecological system. Thus, the sea and river are turned to be deathlike. Accordingly, severe rules have been imposed on the discharge of the waste water containing PVA.

As a measure in compliance with the rules for the waste water containing PVA, therefore, separation of PVA by coagulation with the addition of a chelate compound of boron or a coagulant comprising a high polymer organic compound or a suitable inorganic compound has been adopted in the art. However, in such a method for the separationrecovery of PVA, the formation of sludge is remarkable, the recovery rate of PVA is low and moreover no satisfactory result can be obtained in the point of COD regulation. For instance, in the conventional method of the separation with the use of a chelate compound of boron, although the recovery rate is high as about 90%, the separated product contains a very large amount of water reaching to about 90% and the amount of thus separated PVA is very large, so that its disposal is very difficult. Moreover, when the product is left as it stands, the product returns to a pasty state due to the separation of the chelate by the change of pH, and its treatment is very troublesome. In the case of the separation with the use of an organic or an inorganic coagulant, the recovery rate is very low as about 50%, leaving a large amount of sludge, and there is also a difficulty in its disposal.

SUMMARY OF THE INVENTION

Under such circumstances, the object of the present invention is to develop an excellent method so as to elevate the recovery rate of PVA irrespective of its molecular weight and to minimize the occurrence of sludge.

To describe the outline of the practical treatment in the present invention, a peroxodisulfate ($M_2S_2O_8$, usually called peroxosulfate or persulfate and hereinafter will be called peroxosulfate) is added to the waste water containing PVA, and the mixture is heated to a temperature in the range of from 70° C. to a boiling point so as to make said PVA insoluble and to recover PVA almost completely by separation. In the case where the waste water contains not more than 2.5% PVA, PVA becomes insoluble by the addition of a peroxosulfate such as ammonium peroxosulfate ($(NH_4)_2S_2O_8$) and can be separated straightly from the water. When the waste water contains more than 2.5% PVA, PVA loses its adhesion property and is gelatinized due to the addition of a peroxosulfate and can be separated therefrom by leaving water at pH of 8-9. The amount of peroxosulfate to be added is about 0.18 mol per 1 mol of PVA when its concentration in the waste water is 1%.

In the present invention, further, it is desirable to make the waste water containing PVA acidic by the addition of sulfuric acid prior to the treatment with the use of a peroxosulfate. The treating temperature is as before. In this instance, the necessary amount of peroxosulfate is 0.10 mol% per 1 mol of PVA, when its concentration is 1% in contrast to the value of 0.18 mol in the former case. Therefore, it is obvious that the treatment under an acidic condition is more economical.

The recovery rate of PVA is excellent and particularly the water content of thus separated PVA is as low as 60-70% in contrast to about 90% in the conventional art. Further, said PVA has no adhesive property, being insoluble in acid and alkali, and does not change its properties in the progress of time. Therefore, it can easily be dried and burnt, and the product thus obtained can advantageously be utilized, for instance, as fuel.

In the present invention, accordingly, the environmental pollution due to waste water containing PVA in the textile industry can skillfully be prevented and the thus separated PVA can beneficially be utilized.

DETAILED DESCRIPTION OF THE PREFERRED EMBODIMENTS

The embodiments of the invention will be described in detail in the following with reference to the apparatus to perform the treatment.

EXAMPLE 1

Figure 1:
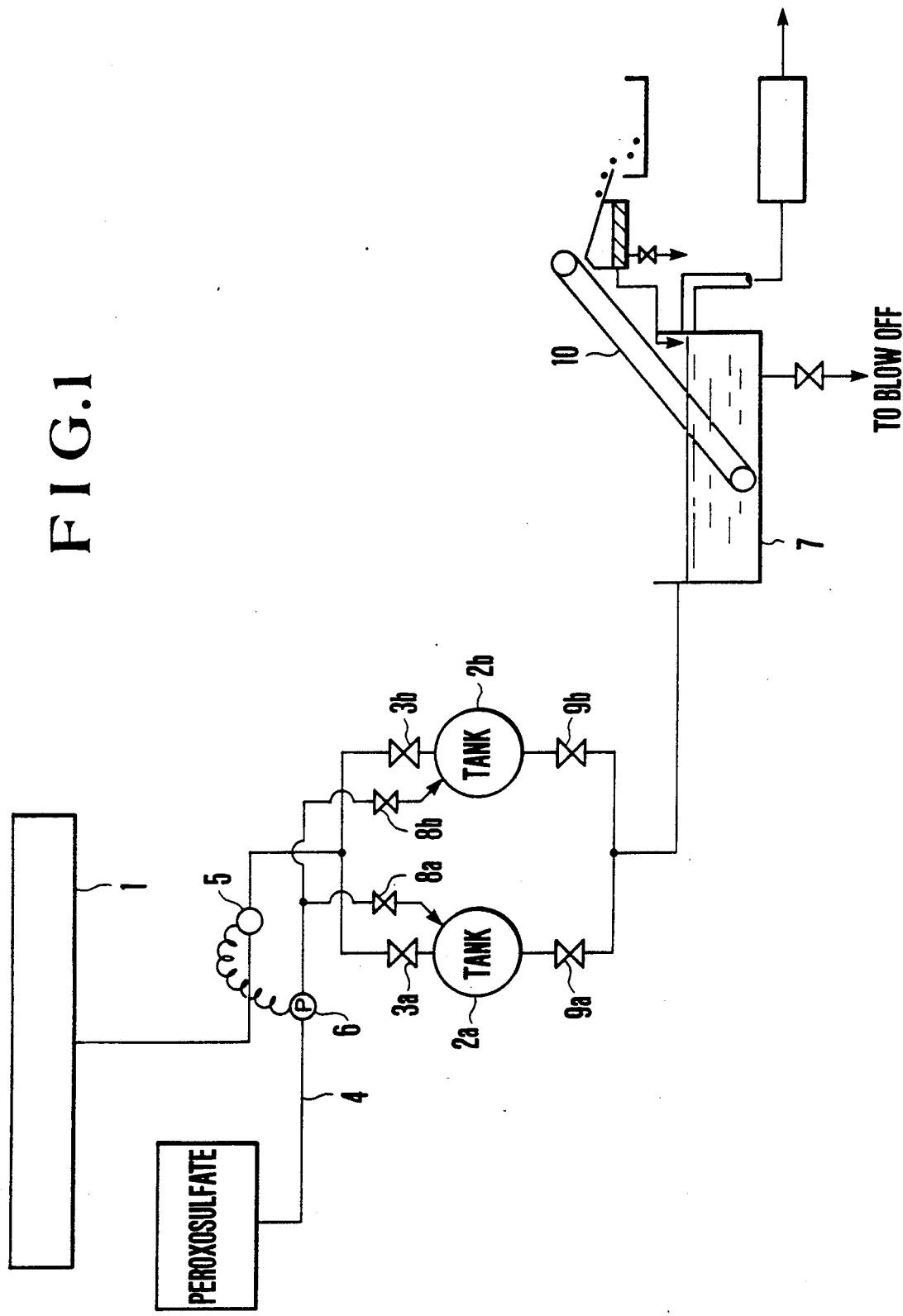
FIGS. 1, 2 and 3 are respectively to show an example of the apparatus to be used for the present inventive method of the separation of PVA from water such as the waste water in the textile industry.

In FIG. 1, 1 is a waste water tank to store the waste water to be treated, for instance, discharged from the desizing and scouring process in the textile industry, 2a and 2b are the timing tanks to receive the waste water from the waste water tank 1. More than two timing tanks may also be employed. Due to the action of the electromagnetic valves 3a and 3b, the waste water is supplied to each of the timing tanks 2a and 2b. 4 is a supply pipe to supply a suitable amount of a peroxosulfate solution into each of the timing tanks 2a and 2b. Such a salt as of ammonium, potassium and sodium can be used. It is designed so as to measure the amount of the waste water to be supplied from the waste water tank 1 into the timing tanks 2a and 2b by means of a flow meter 5, and to supply a suitable amount of the peroxosulfate thus calculated into the timing tanks 2a and 2b by the operation of a pump 6. 7 is a separation and recovery tank of PVA, and it is designed so that the PVA in this tank is recovered by means of a separation belt 10. 8a and 8b and 9a and 9b are respectively to show an electromagnetic valve.

Now, the function of this apparatus will be stated in the following. At first, the waste water containing PVA in the waste water tank 1 is introduced in the timing tank 2a by opening the valve 3a. Then, a peroxosulfate (for instance, ammonium, potassium or sodium salt) is supplied into the tank 2a in an amount in proportion with the amount of PVA therein by opening the valve 8a and operating the pump 6. The waste water in the timing tank 2a is heated simultaneously to 70°-100° C. Then, PVA in the tank is reacted with said peroxosulfate so as to be precipitated from water in about 0.2-4 minutes. The thus treated solution is supplied into the separation and recovery tank 7 by opening the valve 9a for the separation of PVA. In the meantime, the waste water and the peroxosulfate are introduced into another timing tank 2b by the same procedure, and the precipitation of PVA is proceeded similarly. After the treated water in the timing tank 2a has completely been transferred to the separation and recovery tank 7, the valve 9b is opened and the treated water in the timing tank 2b is supplied in the separation and recovery tank 7. Then similar treatments are repeated to supply the treated water in the timing tanks 2a and 2b alternately into the separation and recovery tank 7. From the treated water in the separation and recovery tank 7, PVA is recovered due to the action of the separation belt 10, and the remaining water can be reused.

The relation between the necessary amount of ammonium peroxosulfate and the concentration of PVA in the waste water to be treated as well as the relation between the necessary treating time and the treating temperature will be shown in Table 1.

TABLE 1

(a) The relation between the necessary amount of ammonium peroxosulfate and the concentration of PVA
(1) PVA polymerization degree: 1700
  Saponification degree: 98%
(2) Peroxosulfate $(NH_4)_2S_2O_8$

| Concentration of PVA (%) | $(NH_4)_2S_2O_8$/PVA (wt. %) |
|---|---|
| 1 | 0.93 |
| 2 | 1.67 |
| 3 | 2.18 |
| 4 | 2.70 |
| 5 | 3.37 |
| 6 | 3.92 |
| 7 | 4.47 |
| 8 | 4.98 |
| 9 | 5.51 |
| 10 | 6.02 |

(b) The relation between the temperature and the treating time

| Temperature (°C.) | Treating time |
|---|---|
| 90 | 15 sec. |
| 80 | 60 sec. |
| 70 | 3 min. 40 sec. |
| 60 | 18 min. |
| 50 | 1 hr. 35 min. |

EXAMPLE 2

Figure 2:
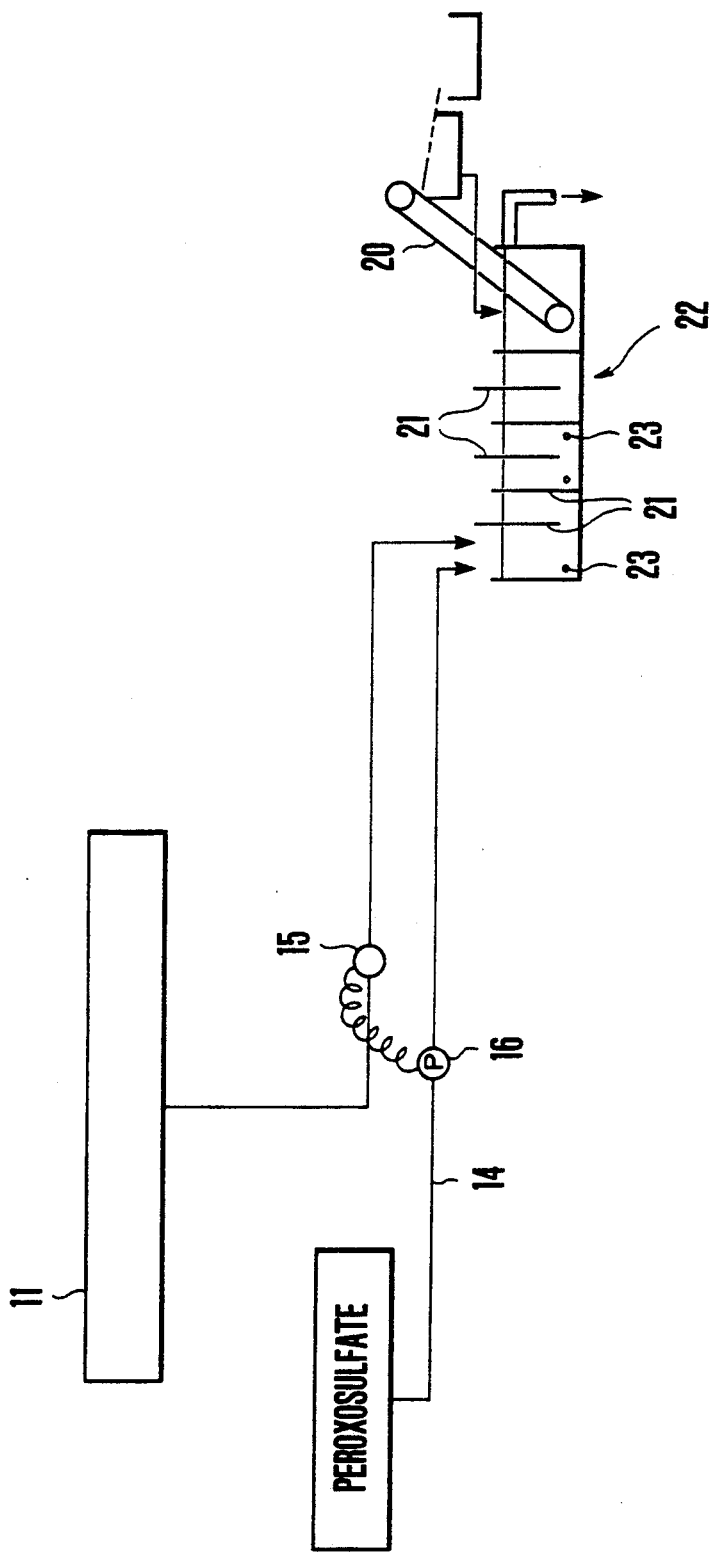

In Example 1, the reaction between PVA in the waste water and the peroxosulfate was done intermittently in a plurality of timing tanks, but the reaction can be done continuously by using, for instance, an apparatus as shown in FIG. 2.

Namely, the waste water containing PVA in a waste water tank 11 is supplied in a reaction tank 22 continuously at a constant rate, of which amount being determined by means of a flowmeter, 15. The reaction tank 22 is fitted with a plurality of preventing plates 21 so as to pass the waste water zigzag through the tank continuously and a plurality of heaters 23. In proportion with the supply amount of the waste water, the corresponding amount of a peroxosulfate, for instance, ammonium peroxosulfate, is added by means of a pump 16 into the waste water in the reaction tank 22. In the reaction tank 22, the waste water containing PVA, to which a peroxosulfate is added in this way, is heated by means of heaters 23 to a temperature in the range of 70°-100° C. for the reaction between them, and the thus precipitated PVA is recovered through a separation belt 20 similarly as in the case of Example 1.

EXAMPLE 3

This example is to show the case in which the treatment is done in an acidic condition by the addition of sulfuric acid.

Figure 3:
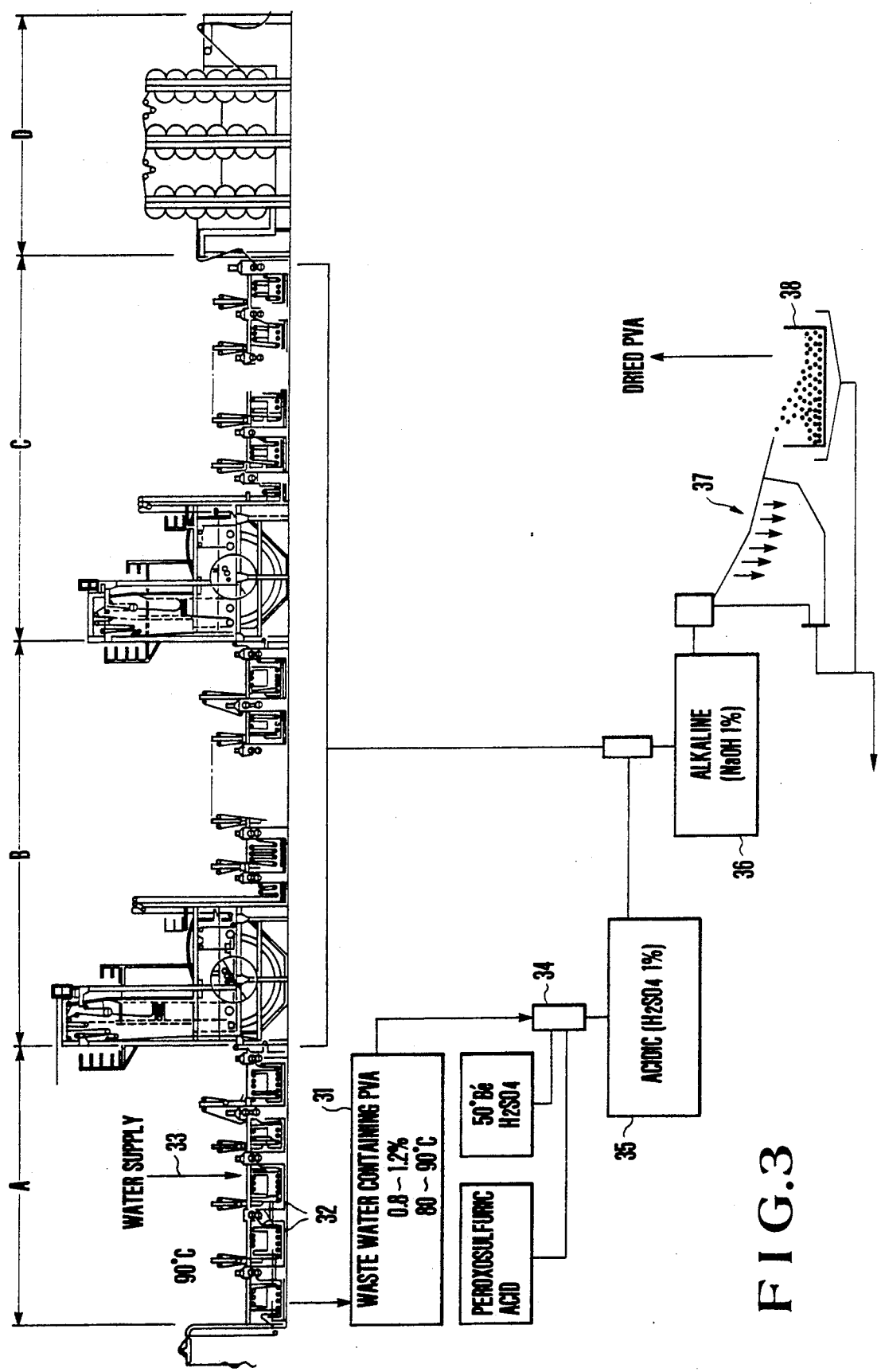

In FIG. 3, the upper part is to explain the pretreatment process of a long cloth continuously, in which A is a desizing process, B is a scouring process, C is a bleaching process and D is a drying process. These processes are well known in the art and are not relating to the essential points of the present invention. Therefore, the explain of these processes in this apparatus will be abridged in this place.

In the lower part of FIG. 3, 31 is a receive tank for receiving the waste water containing PVA from each of the washing tanks 32 in the desizing process A. The concentration of PVA in the waste water to be supplied into the receive tank 31 is controlled by using a concentration sensor (not shown in the figure) in supplying water from the water supply pipe 23 so as to control the concentration of PVA therein to a range of about 1.0-1.2%. In the receive tank 31, a heater (not shown in the figure) is provided for heating the waste water therein to about 80°-90° C. 34 is a mixer, in which, per 1000 cc of the waste water with the above mentioned PVA concentration coming from the receive tank 31, an appropriate amount of a peroxosulfate (4 g in the case of ammonium-peroxosulfate) and 10 cc of 50°Bé sulfuric acid are added. By leaving the thus obtained mixed solution for a while in a timing tank 35, PVA loses its adhesion property and becomes insoluble in water.

The thus treated solution containing precipitated PVA is stored in a neutralization tank 36 for a while with the addition of a neutralization agent, for instance a sodium hydroxide solution, for the neutralization of PVA. As the neutralization agent, it is beneficial to utilize the mixture of weak alkaline waste waters exhausted from the above-mentioned scouring process B and bleaching process C (containing about 1% sodium hydroxide) for the saving of the neutralization agent. The resultant neutralized solution containing PVA is transferred to a separation apparatus 37, and PVA is separated therefrom. The water content of PVA obtained is about 60-70% similarly as in the preceding examples, and can easily be dried in a drying apparatus 38. The thus dried PVA has a calorific value of about 4000-4600 cal/g in combustion, so that it can beneficially be utilized as fuel.

The practical data in this example is as shown in Table 2. It is obvious therefrom that the necessary amount of ammonium peroxosulfate for the separation of PVA can remarkably be reduced to 4 g/l in the presence of sulfuric acid as compared with 7 g/l in the case when sulfuric acid is not added. Therefore, in the case of the addition of sulfuric acid as in this example, the use of relatively expensive peroxosulfate can be reduced economically to about a half as compared with the case of no sulfuric acid addition.

TABLE 2

The relation between the addition amount of sulfuric acid and the necessary amount of $(NH_4)_2S_2O_8$ The treating condition:

| PVA: | degree of polymerization 1,700 |
| --- | --- |
| | degree of saponification 98% |
| | concentration 1% |
| Treatment: | 95° C. × 10 minutes neutralization with NaOH solid-liquid separation by filtration dehydration by screw |
| Result: | (per waste water containing PVA) |

| 50° Bé $H_2SO_4$ added (cc/l) | $(NH_4)_2S_2O_8$ consumed (g/l) |
| --- | --- |
| 0 | 7 |
| 5 | 5 |
| 10 | 4 |

TABLE 2-continued

The relation between the addition amount of sulfuric acid and the necessary amount of $(NH_4)_2S_2O_8$

| 20 | 4 |
| --- | --- |

What is claimed is:

1. A method for the precipitation of polyvinyl alcohol from an aqueous solution thereof comprising adding peroxodisulfate to an aqueous polyvinyl alcohol solution, and heating the resultant solution to a temperature above 70° C. to precipitate polyvinyl alcohol therefrom, wherein the precipitation of polyvinyl alcohol is done in an acidic condition by addition of the sulfuric acid.

2. A method for precipitation of polyvinyl alcohol from an aqueous solution thereof described in claim 1, wherein ammonium peroxodisulfate is used as an peroxodisulfate.

3. A method for precipitation of polyvinyl alcohol from an aqueous solution thereof described in any one of the preceding claims, wherein the aqueous polyvinyl alcohol solution comprises waste water containing polyvinyl alcohol obtained from pretreatment of a textile product with use of polyvinyl alcohol.

* * * * *